United States Patent
Whelan et al.

(10) Patent No.: US 11,259,974 B1
(45) Date of Patent: Mar. 1, 2022

(54) DAMPENING SYSTEM FOR WHEELCHAIR AND WHEELCHAIR THEREWITH

(71) Applicant: Ki Mobility LLC, Stevens Point, WI (US)

(72) Inventors: Thomas J. Whelan, Stevens Point, WI (US); Alan Ludovici, Stevens Point, WI (US)

(73) Assignee: Ki Mobility LLC, Stevens Point, WI (US)

(*) Notice: Subject to any disclaimer, the term of this patent is extended or adjusted under 35 U.S.C. 154(b) by 818 days.

(21) Appl. No.: 15/866,418

(22) Filed: Jan. 9, 2018

Related U.S. Application Data (63) Continuation-in-part of application No. 15/054,056, filed on Feb. 25, 2016, now Pat. No. 10,702,431.

(60) Provisional application No. 62/444,196, filed on Jan. 9, 2017.

(51) Int. Cl.
- *A61G 5/10* (2006.01)
- *A47C 7/02* (2006.01)
- *A47C 7/42* (2006.01)

(52) U.S. Cl.
CPC .............. *A61G 5/1081* (2016.11); *A47C 7/02* (2013.01); *A47C 7/42* (2013.01); *A61G 5/1078* (2016.11)

(58) Field of Classification Search
CPC .... A61G 5/1056; A61G 5/1059; A61G 5/107; A61G 5/1072; A61G 5/1078; A61G 5/1081; A61G 5/10
See application file for complete search history.

(56) References Cited

U.S. PATENT DOCUMENTS

| | | | |
|---|---|---|---|
| 4,113,221 A | 9/1978 | Wehner | |
| 4,641,848 A | 2/1987 | Ayers | |
| 4,667,943 A | 5/1987 | Izumi et al. | |
| 5,131,672 A * | 7/1992 | Robertson | A61G 5/00 280/250.1 |
| 5,267,745 A | 12/1993 | Robertson | |
| 5,284,350 A * | 2/1994 | Geiger | A61G 5/08 280/250.1 |
| 5,421,598 A * | 6/1995 | Robertson | A61G 5/00 280/250.1 |

(Continued)

FOREIGN PATENT DOCUMENTS

| | | | |
|---|---|---|---|
| EP | 0677285 | 5/2000 | |
| EP | 2007337 | 3/2014 | |
| GB | 2 131 360 | * 5/1986 | ............... A61G 5/00 |

OTHER PUBLICATIONS

US Patent and Trademark Office, Final Office Action, dated Dec. 9, 2019, in related U.S. Appl. No. 15/054,056, filed Feb. 25, 2016.

(Continued)

*Primary Examiner* — Michael P Ferguson
(74) *Attorney, Agent, or Firm* — Thedford I. Hitaffer; Hitaffer & Hitaffer, PLLC (57) ABSTRACT

A dampening system is efficient in dampening vibration through a wheelchair frame. The system allows a lower base frame and wheels to be rigidly attached, while an upper seat frame is joined to the base frame through elastomeric dampening bushings to isolate the seat frame from the base frame. The bushings may be hidden in vertical upright tubes of the base frame. The bushings can also be used for supporting front caster forks and/or a rear axle assembly in isolation to the base frame.

15 Claims, 7 Drawing Sheets

(56) References Cited

U.S. PATENT DOCUMENTS

| | | | |
|---|---|---|---|
| 5,590,893 A | | 1/1997 | Robinson |
| 5,597,566 A | | 1/1997 | Huls |
| 6,135,476 A | * | 10/2000 | Dickie .................. A61G 5/045 |
| | | | 280/250.1 |
| 6,247,717 B1 | | 6/2001 | Lovins |
| 6,345,833 B2 | * | 2/2002 | Melgarejo ............... A61G 5/00 |
| | | | 280/250.1 |
| 6,447,064 B1 | * | 9/2002 | Mundy .................. A61G 5/00 |
| | | | 297/313 |
| 6,832,784 B1 | | 12/2004 | Chen |
| 6,913,318 B2 | | 7/2005 | Higley |
| 7,032,972 B2 | | 4/2006 | Hambright |
| 7,198,284 B2 | * | 4/2007 | Cerreto .................. A61G 5/08 |
| | | | 280/649 |
| 7,520,518 B2 | | 4/2009 | Peterson |
| 8,256,785 B2 | * | 9/2012 | Knopf .................. A61G 5/1054 |
| | | | 280/250.1 |
| 8,434,775 B2 | | 5/2013 | Patmont et al. |
| 8,888,190 B2 | * | 11/2014 | Peek .................... A61G 5/1056 |
| | | | 297/423.19 |
| 9,248,072 B2 | | 2/2016 | Wu |
| 9,358,164 B2 | | 6/2016 | Brenner et al. |
| 10,072,439 B2 | | 9/2018 | Lovley, II |
| 2008/0116660 A1 | | 5/2008 | Nicholls |

OTHER PUBLICATIONS

US Patent and Trademark Office, Non-Final Office Action, dated Jun. 30, 2019, in related U.S. Appl. No. 15/054,056, filed Feb. 25, 2016.

* cited by examiner

DAMPENING SYSTEM FOR WHEELCHAIR AND WHEELCHAIR THEREWITH

CROSS-REFERENCE TO RELATED APPLICATIONS

This application is a continuation-in-part of U.S. Pat. No. 10,702,431 on Jul. 7, 2020, based on U.S. patent application Ser. No. 15/054,056, filed on Feb. 25, 2016, and claims the benefit of U.S. Provisional Application No. 62/444,196, filed Jan. 9, 2017, the disclosures of which are incorporated herein by reference in their entirety.

BACKGROUND OF THE INVENTION

This invention relates in general to a dampening system for wheelchairs. The invention is particularly suitable for isolating wheelchair users from the base frame of wheelchairs.

Using a wheelchair over rough surfaces, such as asphalt, which often has stone mixed therein, or small rumble strips, can cause a lot of vibration of the wheelchair. Most materials used in wheelchairs do not dissipate this vibration. The vibration is transferred to the occupant of the wheelchair. This can cause numerous issues, including pain from hypersensitivity of some users, and fatigue from the vibration. Most wheelchairs are made of aluminum. Aluminum is strong, lightweight and stiff. Due to its stiffness, aluminum does not absorb vibration well.

The key to making a wheelchair perform well and be efficient to propel is having a rigid frame joining the front and rear wheels of the wheelchair together. Numerous techniques are employed to dampen some of the vibration transmitted through wheelchair frames. These include the use of softer tires, seat cushions and backs, and seat slings. However, these techniques often reduce the efficiency and performance of the wheelchair.

Dampening techniques also include the use of resilient suspension systems for supporting the frame in relation to the front and rear wheels of the wheelchair. Such suspension systems can create issues for wheelchair users, including instability, which can result from a change in the center of gravity of the user, which can lead to the user and chair tipping over or falling forward. Suspension systems may work well if used outdoors over small obstacles, like grass. However, suspension systems absorb a lot of user energy when propelling the chair, which reduces efficiency. This is because suspension systems absorb energy when actively being used.

The key to a good design is to have a rigid bottom or base frame, which ties all the wheels together, and a seat or upper frame, which is isolated from the bottom frame. Because the bottom frame is rigid, there is no power loss through the flex or suspension of the bottom frame. This works the same for other vehicles, such as race cars, wherein the chassis and suspension is very stiff to transmit as much power to the ground.

SUMMARY OF THE INVENTION

The present invention relates to a dampening system that is efficient in dampening vibration through a frame. It allows a lower base frame and wheels to be rigidly attached, while an upper seat frame is joined to the base frame through elastomeric dampening bushings, thus isolating the seat frame from the base frame. The bushings may be hidden in vertical upright tubes of the base frame. The bushings can also be used for supporting front caster forks and/or a rear axle in isolation to the base frame.

The dampening or isolation bushings may be housed within a cylindrical tube. For the bushings to absorb vibration, the bushings compress and return to their original shape. If the bushings were a solid elastomer within a tube, the elastomer would have no way to translate the vibration. The bushings preferably have radially extending projections equally spaced about a circle. Voids are provided between the projections. The projections can compress and fill the voids. This allows the voids to absorb vibration transmitted through the wheelchair frame. The bushings can absorb vibration in any radial and axial direction.

Various advantages of this invention will become apparent to those skilled in the art from the following detailed description of the preferred embodiment, when read in light of the accompanying drawings.

DETAILED DESCRIPTION OF THE PREFERRED EMBODIMENT

Figure 1:
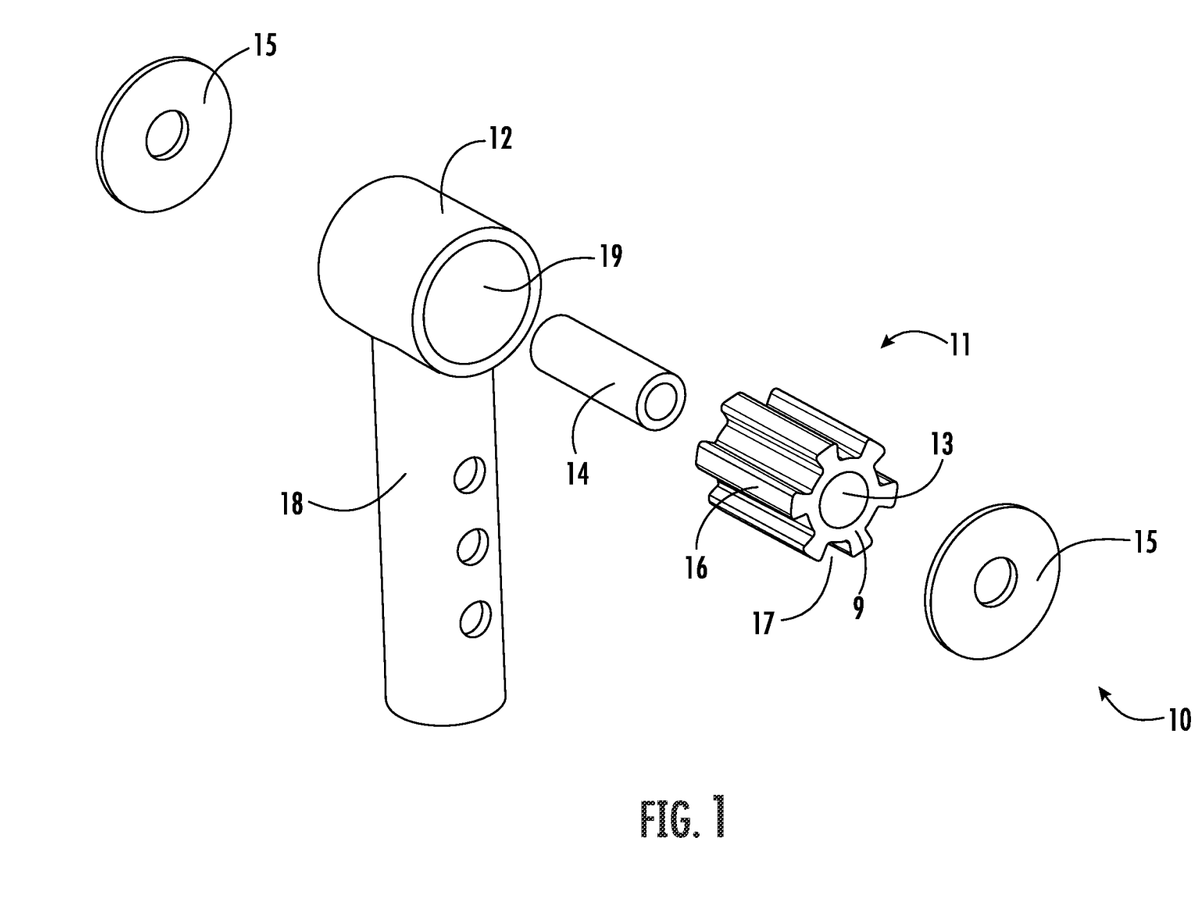
FIG. 1 is an exploded front perspective view of an exemplary dampening system.
Figure 2:
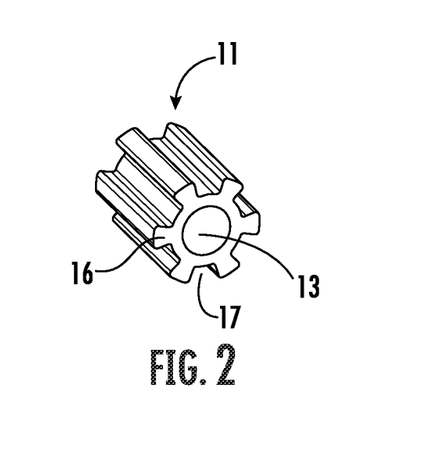
FIG. 2 is a front perspective view of a bushing of the system shown in FIG. 1.
Figure 3:
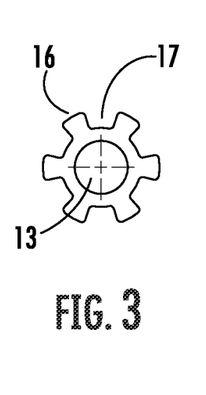
FIG. 3 is a front view of the bushing shown in FIG. 2.
Figure 4:
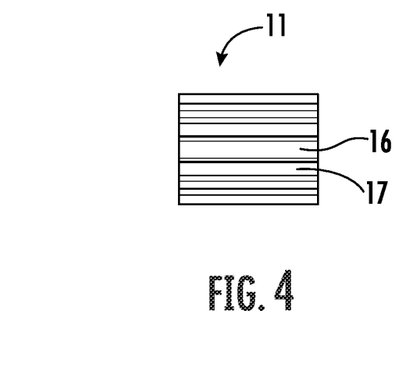
FIG. 4 is a side view of the bushing shown in FIG. 2.

Referring now to the drawings, there is illustrated in FIGS. 1-5 an exemplary dampening system 10 comprising a wheelchair frame component (e.g., vertical height adjustment tube 18) supporting an elastomeric dampening bushing 11 that is housed snuggly or tightly within an inner cylindrical wall 19 of a cylindrical tubular housing 12 (i.e., atop the vertical height adjustment tube 18 when viewing FIG. 1). The elastomeric dampening bushing 11 may be made of urethane material in various durometers for a wide range of user weight and dampening. Inside an inner bushing area 13, a center spacer (i.e., sleeve) 14 is inserted. Washers 15 may be used to retain the bushing 11 inside the cylindrical tubular housing 12 and allow the bushing 11 to translate in any position or direction in a radial projection space 17. The washers 15 can made of nylon or other suitable material.

The bushing 11 is shaped to have multiple radial projections (i.e., spokes) 16 equally spaced about a hub 9 defining the inner bushing area 13, with the radial projection space 17 between each radial projection 16. The bushing 11 can be made shorter, or the projections 16 can be made thicker or thinner, or multiple bushings 11 can be stacked or spaced out within the cylindrical tubular housing 12. When the bushing 11 is positioned inside the cylindrical tubular housing 12, the radial projections 16 of the bushing 11 are flush against an inner cylindrical wall 19 of the cylindrical tubular housing 12. This forms a snug or tight fit within the cylindrical tubular housing 12, allowing the bushing 11 to be readily deformed when vibration occurs. The bushing 11 is deformed when the radial projections 16 are compressed into the radial projection spaces 17. The bushings 11 may be manufactured from an elastomer, such as urethane, rubber or thermoplastic elastomers. This type of material will allow the bushing 11 to deform or compress and then return to its original shape, upon absorbing the vibration.

Figure 6:
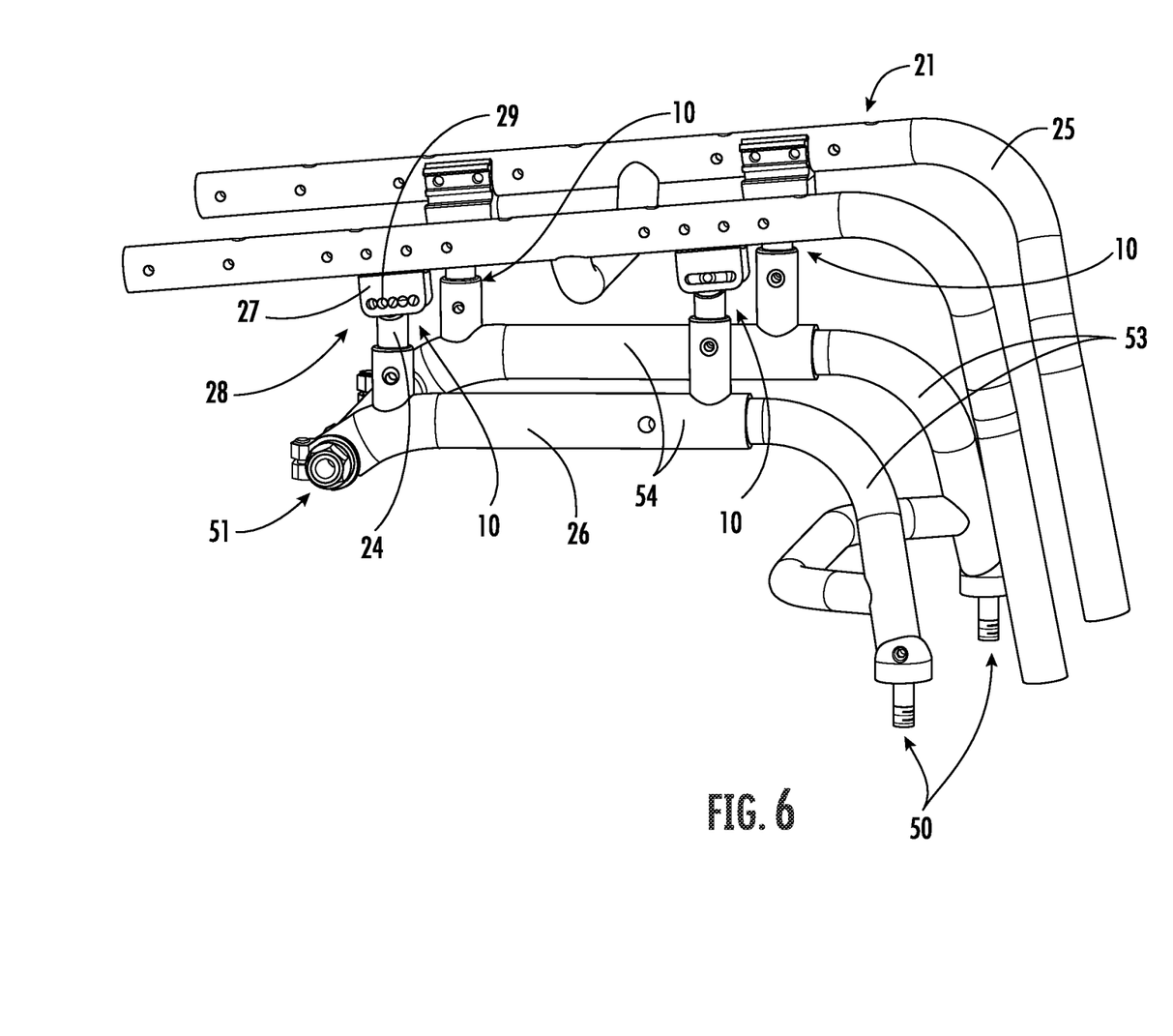
FIG. 6 is a side perspective view of the system isolating a wheelchair base frame from a seat frame.

FIG. 6 shows a relevant part of a wheelchair 20, comprising an exemplary wheelchair frame assembly 21 with adjustable capabilities and employing the bushings 11. The wheelchair frame assembly 21 can employ the dampening system 10 at various structural points so as to effectively maximize vibration absorption. For example, bushings 11 can be housed inside the cylindrical tubular housing 12 at connection points 28.

In the illustrated embodiment, the dampening system 10 is provided at points of attachment between an upper seat frame 25 and a lower base frame 26. The dampening system 10 can be used in conjunction with vertical struts 24 (which may be the same or similar to the vertical height adjustment tube 18 shown in FIGS. 1 and 5, and which is shown in full but not referenced in FIG. 7) that may support a cylindrical tubular housing 12 that houses a bushing 11, and which may allow front and rear seat height adjustment. The dampening system 10 can be used to attach to the upper seat frame 25 at an upper frame connection 27, and, together with the vertical struts 24, create connection points 28. The vertical struts 24 can be adjusted up or down to accommodate different sizes of users. Fasteners (e.g., screws, bolts, rods, pins, or the like) can be inserted through a center spacer 14 (shown in FIGS. 1 and 5) at bushing connection points 29, creating a connection between the upper seat frame 25 and the lower base frame 26. It should be appreciated that a plurality of bushing connection points 29 may be provided, as shown, to permit fore and aft adjustment (e.g., adjustment in left and right directions when viewing the drawings) in the upper seat frame 25 in relation to the lower base frame 26. It should also be understood that the vertical struts 24 may cooperate with the base frame 26 to permit front and rear seat height adjustment. This can be accomplished in any suitable manner. For example, the lower base frame 26 may be provided with sockets (shown but not referenced), which are dimensioned and configured to telescopically receive the vertical struts 24. The vertical struts 24 may be vertically adjusted in relation to the sockets, and secured in a desired fixed position, such as with fasteners (e.g., screws, bolts, rods, pins, or the like) passing through aligning holes in the sockets and the vertical struts. It should be further understood that the wheelchair frame assembly 21 may be made from aluminum or other lightweight yet rigid material to maximize energy efficiency of the wheelchair during use. Such a material may promote translation of vibration throughout various component parts of the wheelchair. To reduce vibration of the upper seat frame 25, it should be appreciated that the dampening system 10 may be used to completely isolate the upper seat frame 25 from the lower base frame 26 to eliminate vibration from the lower base frame 26 to the upper seat frame 25.

Figure 7:
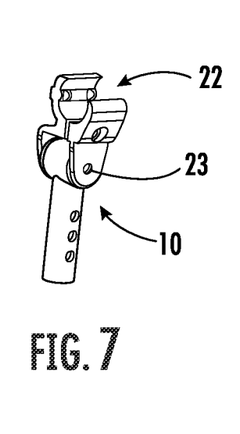
FIG. 7 is a perspective view of a clamp for selectively adjusting the seat frame in relation to the base frame.

A dampening system 10 can also be used in connection with a clamp 22, which attaches to the upper seat frame 25. The clamp 22 may be attached to the dampening system 10 by a fastener (e.g., a screw, bolt or the like) 23, which may be threaded in relation to the center spacer 14, for fastening the clamp 22 to the dampening system 10. This clamp 22 can be indexed along the upper seat frame 25 to adjust the center of gravity of the user, or accommodate different size users. Course adjustment holes are provided along the upper seat frame 25, while fine adjustment holes can be provided along the upper frame connection 27. An example of a clamp and a seat frame tube are shown and described in U.S. patent application Ser. No. 15/054,056, filed on Feb. 25, 2016, issued as U.S. Pat. No. 10,702,431 on Jul. 7, 2020, the disclosure of which is incorporated herein by reference in its entirety.

It should be understood that rear wheels (not shown) can be attached at rear wheel attachment points 51, and front wheels can be attached at front wheel attachment points 50. It should be appreciated that the rear wheel attachment points 51 and the front wheel attachment points 50 may be adjusted in relation to one another, for example, in left and right directions when viewing the drawings. This can be accomplished in any suitable manner. For example, the front wheel attachment points 50 may be supported by front base frame members 53, which may be telescopically adjustable in relation to rear base frame members 54, and secured in a fixed position in any suitable manner, such as by use of fasteners (e.g., a screw, bolt or the like) (not shown) that cooperate with the front and rear base frame members 53, 54.

Figure 8:
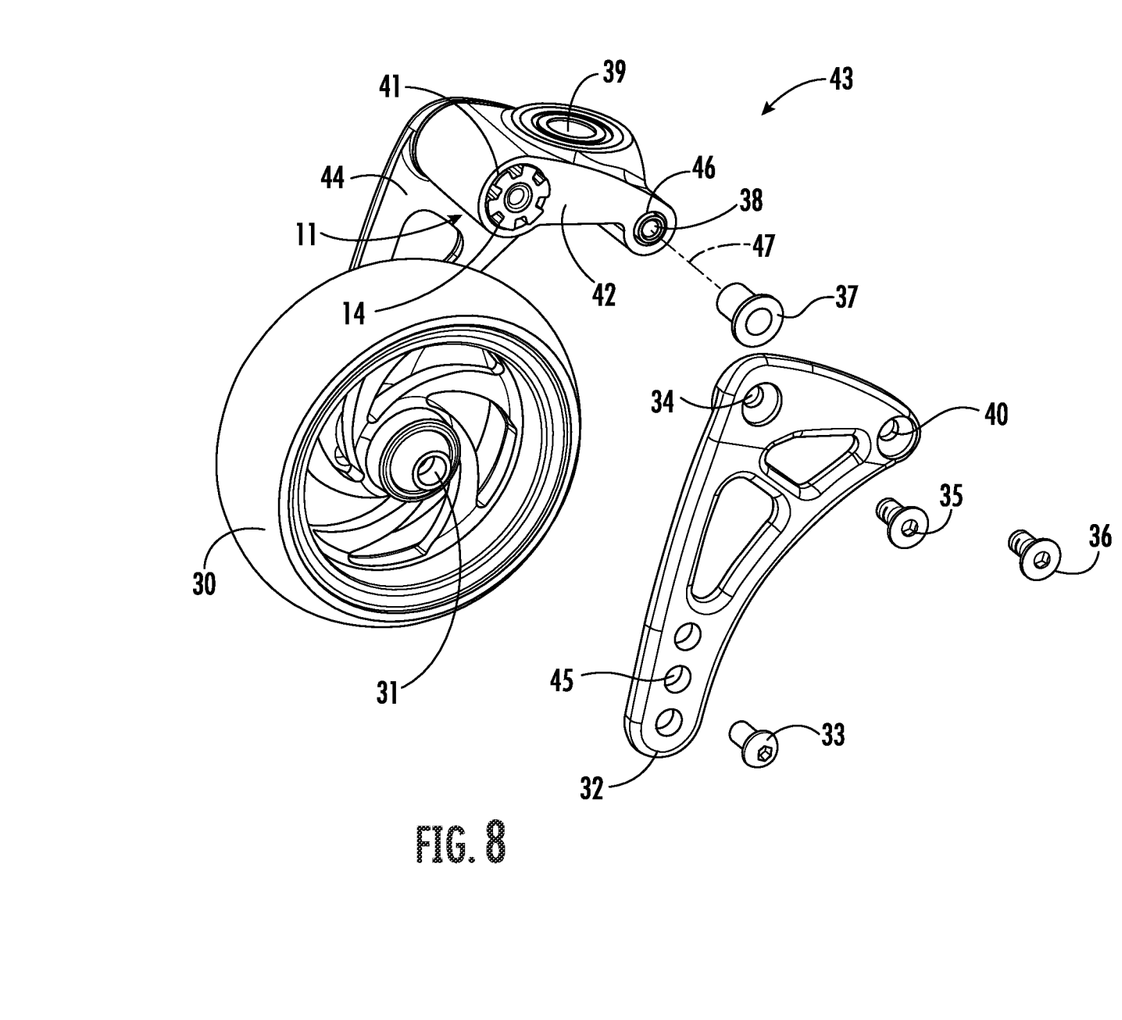
FIG. 8 is a side perspective view of a bushing for isolating a caster fork from a base frame.
Figure 9:
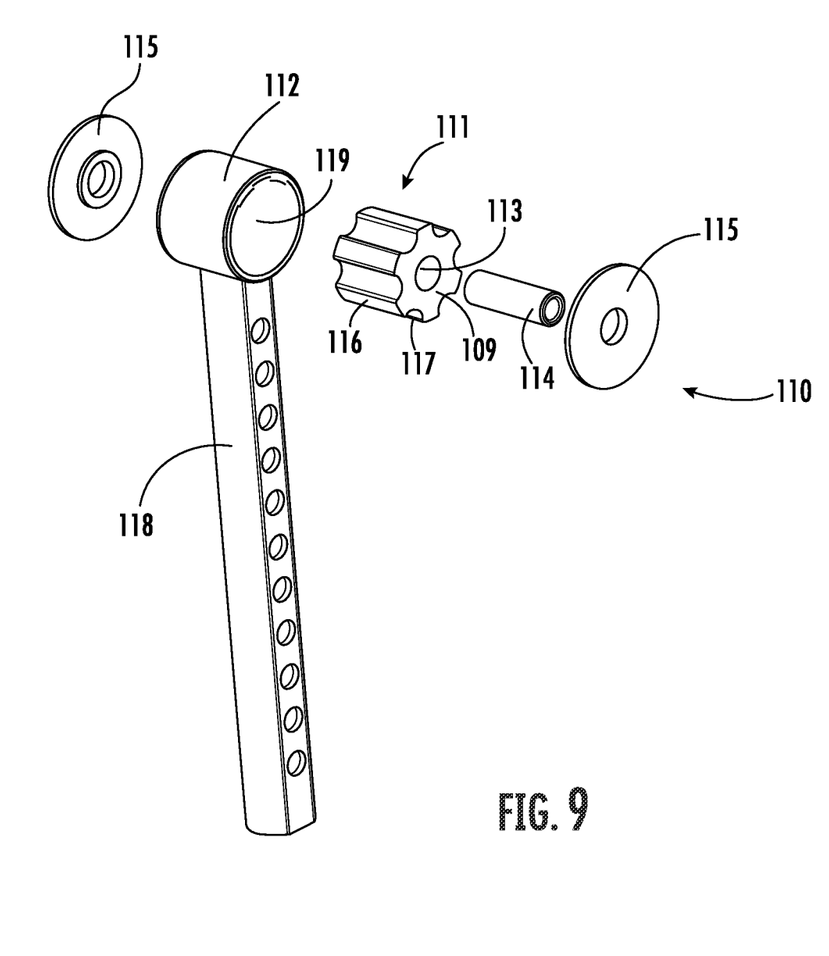
FIG. 9 is an exploded front perspective view of an alternative dampening system.
Figure 10:
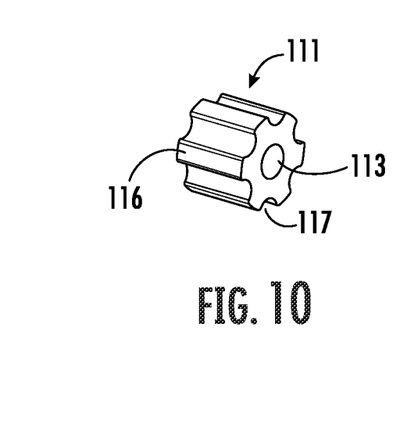
FIG. 10 is a front perspective view of a bushing of the system shown in FIG. 9.
Figure 11:
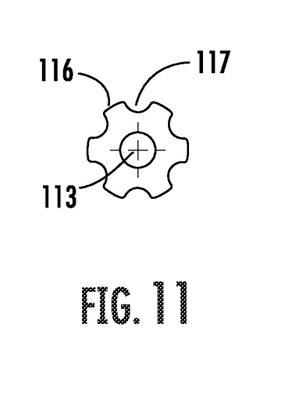
FIG. 11 is a front view of the bushing shown in FIG. 10.
Figure 12:
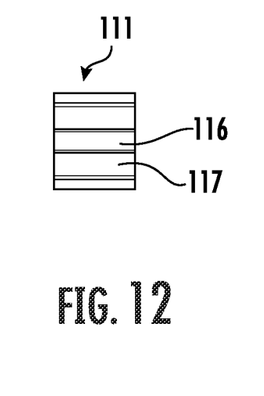
FIG. 12 is a side view of the bushing shown in FIG. 10.
Figure 13:
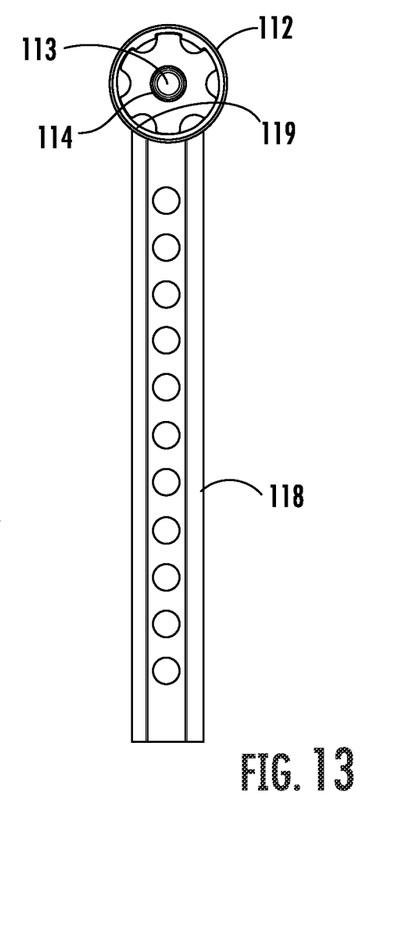
FIG. 13 is a front view of the system shown in FIG. 9.

An example of a fork assembly 43 for attachment of the front wheels is shown in FIG. 8. The front wheel attachment points 50 may each include a downwardly projecting spindle, which may cooperate with a bearing 39 of the fork assembly 43. The exemplary fork assembly 43 shows a bushing 11 employed with the caster fork assembly 43 for dampening movement of the caster fork assembly 43 to reduce vibration to the wheelchair as received by a caster wheel 30. The caster fork assembly 43 is attachable to a wheelchair frame assembly 21 at the front caster wheel attachment points 50 (shown in FIG. 6). A caster wheel 30 is attachable to a caster fork blade 32, for example, by passing a fastener (e.g., a threaded screw or bolt) 33 through a fork hole 45 through a fork blade 32, and threading the fastener 33 into the front caster wheel 30, thus forming a fork blade caster wheel connection at 31. The same may be repeated for the opposing caster fork blade 44. The bushing 11 is housed inside an upper caster fork spindle support 42 in a fork bushing housing 41. The fork blade 44 and caster fork spindle support 42 may be formed from one piece or may be separate pieces attached together. The bushing 11 housed in the fork bushing housing 41 may be secured to the fork blade 32 by inserting a fastener (e.g., threaded screw or bolt) 35 through fork blade hole 34, and further threading it into the center spacer 14. To complete attachment of the fork blade 32 to the caster fork spindle support 42, a fastener (i.e., a threaded bolt or screw) 36 may be inserted through a fork blade hole 40, and threaded at the pivot axis 47 located on the upper caster fork spindle support 42 into a pivot axis spacer 38 housed inside a pivot axis housing 46. Optionally, a rigid bushing 37 may be used to reduce friction and wear due to radial and thrust forces. The caster fork assembly 43 pivots about the pivot axis 47 to translate in a rotary motion for the caster fork assembly 43 in relation to the wheelchair frame assembly 21. As the caster fork assembly 43 pivots, vibration experienced by the caster wheel 30 is effectively reduced by the bushing 11 as the radial projections 16 (shown in FIGS. 1-4) are compressed.

Figure 5:
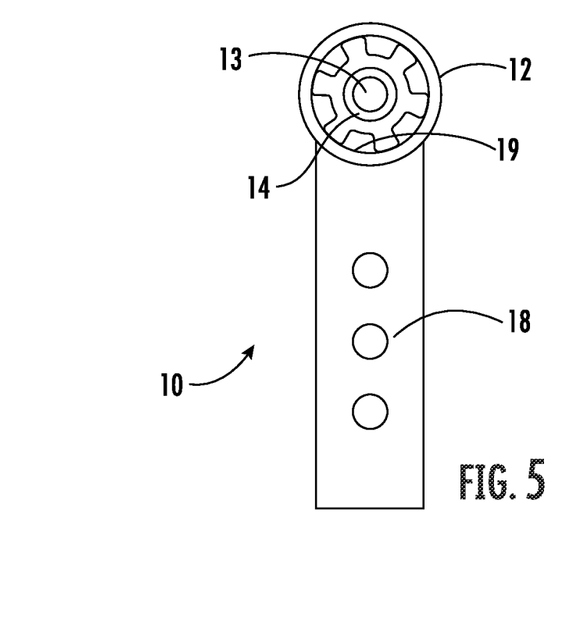
FIG. 5 is a front view of the system shown in FIG. 1.

In the fork bushing housing 41 in FIG. 8, or the cylindrical tubular housing 12 in FIGS. 1 and 5, multiple bushings 11 can be linearly arranged or spaced out, or one bushing 11 can be inserted within a length of the entire housing 12 or only a partial length of the housing 12.

It should be understood that the dampening system 10 may include a tubular housing, apart from the vertical height adjustment tube 18 and the caster fork assembly 43, and that the bushing and the tubular housing may take on other general shapes (e.g., a general oval, square, rectangular or triangular shape), wherein the bushing comprises radial projections with spacing therebetween, wherein the bushing fits flush against the inner wall of the tubular housing to form a snug or tight fit with the tubular housing.

An alternative dampening system 110 is shown in FIGS. 9-13. The dampening system 110 is very similar to the dampening system 11 described above with reference to FIGS. 1-5. This dampening system 110 comprises a wheelchair frame component (e.g., vertical height adjustment post 118) supporting an elastomeric dampening bushing 111 that is housed snuggly or tightly within an inner cylindrical wall 119 of a cylindrical tubular housing 112 (i.e., atop the vertical height adjustment post 118 when viewing FIG. 9). The elastomeric dampening bushing 111 may be made of urethane material in various durometers for a wide range of user weight and dampening. Inside an inner bushing area 113, a center spacer (i.e., sleeve) 114 is inserted. Washers 115 may be used to retain the bushing 111 inside the cylindrical tubular housing 112 and allow the bushing 111 to translate in any position or direction in a radial projection space 117. The washers 115 can made of nylon or other suitable material.

The bushing 111 is shaped to have multiple radial projections (i.e., spokes) 116 equally spaced about a hub 109 defining the inner bushing area 113, with the radial projection space 117 between each radial projection 116. The bushing 111 can be made shorter, or the projections 116 can be made thicker or thinner, or multiple bushings 111 can be stacked or spaced out within the cylindrical tubular housing 112. When the bushing 111 is positioned inside the cylindrical tubular housing 112, the radial projections 116 of the bushing 111 are flush against an inner cylindrical wall 119 of the cylindrical tubular housing 112. This forms a snug or tight fit within the cylindrical tubular housing 112, allowing the bushing 111 to be readily deformed when vibration occurs. The bushing 111 is deformed when the radial projections 116 are compressed into the radial projection spaces 117. The bushings 111 may be manufactured from an elastomer, such as urethane, rubber or thermoplastic elastomers. This type of material will allow the bushing 111 to deform or compress and then return to its original shape, upon absorbing the vibration.

Figure 14:
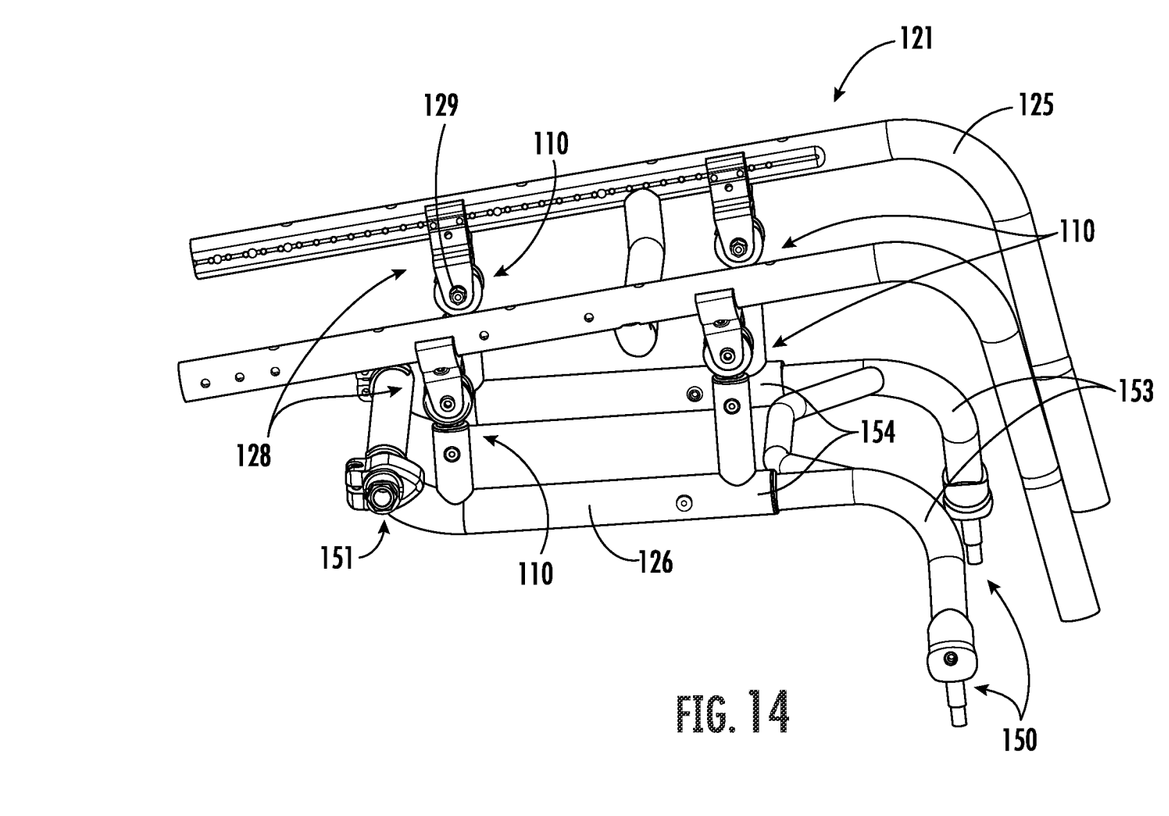
FIG. 14 is a side perspective view of the system isolating a wheelchair base frame from a seat frame.

FIG. 14 shows a relevant part of a wheelchair 120, comprising an exemplary wheelchair frame assembly 121 with adjustable capabilities and employing the bushings 111. The wheelchair frame assembly 121 can employ the dampening system 110 at various structural points so as to effectively maximize vibration absorption. For example, bushings 111 can be housed inside the cylindrical tubular housing 112 at connection points 128.

In the illustrated embodiment, the dampening system 110 is provided at points of attachment between an upper seat frame 125 and a lower base frame 126. The dampening system 110 can be used in conjunction with vertical struts 124 (which may be the same or similar to the vertical height adjustment post 118 shown in FIGS. 9 and 13, and which is shown in full but not referenced in FIG. 15) that may support a cylindrical tubular housing 112 that houses a bushing 111, and which may allow front and rear seat height adjustment. The dampening system 110 can be used to attach to the upper seat frame 125 at connection points 128. The vertical struts 124 can be adjusted up or down to accommodate different sizes of users. Fasteners (e.g., screws, bolts, rods, pins, or the like) can be inserted through a center spacer 114 (shown in FIGS. 9 and 13) at bushing connection points 129, creating a connection between the upper seat frame 125 and the lower base frame 126. It should also be understood that the vertical struts 124 may cooperate with the base frame 126 to permit front and rear seat height adjustment. This can be accomplished in any suitable manner. For example, the lower base frame 126 may be provided with sockets (shown but not referenced), which are dimensioned and configured to telescopically receive the vertical struts 124. The vertical struts 124 may be vertically adjusted in relation to the sockets, and secured in a desired fixed position, such as with fasteners (e.g., screws, bolts, rods, pins, or the like) passing through aligning holes in the sockets and the vertical struts.

It should be further understood that the wheelchair frame assembly 121 may be made from aluminum or other lightweight yet rigid material to maximize energy efficiency of the wheelchair during use. Such a material may promote translation of vibration throughout various component parts of the wheelchair. To reduce vibration of the upper seat frame 125, it should be appreciated that the dampening system 110 may be used to completely isolate the upper seat frame 125 from the lower base frame 126 to eliminate vibration from the lower base frame 126 to the upper seat frame 125.

Figure 15:
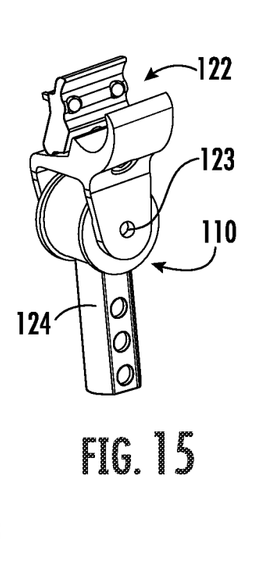
FIG. 15 is a perspective view of a clamp for selectively adjusting the seat frame in relation to the base frame.

A dampening system 110 can also be used in connection with a clamp 122, which attaches to the upper seat frame 125. The clamp 122 may be attached to the dampening system 110 by a fastener (e.g., a screw, bolt or the like) 123, which may be threaded in relation to the center spacer 114, for fastening the clamp 122 to the dampening system 110. This clamp 122 can be indexed along the upper seat frame 125 to adjust the center of gravity of the user, or accommodate different size users. Course adjustment holes are provided along the upper seat frame 125, while fine adjustment holes can be provided along the upper frame connection 127. An example of a clamp and a seat frame tube are shown and described in U.S. patent application Ser. No. 15/054,056, filed on Feb. 25, 2016, issued as U.S. Pat. No. 10,702,431 on Jul. 7, 2020, the disclosure of which is incorporated herein by reference in its entirety.

It should be understood that rear wheels (not shown) can be attached at rear wheel attachment points 151, and front wheels can be attached at front wheel attachment points 150. An example of a fork assembly 43 for attachment of the front wheels is shown in FIG. 8, and described above. It should be appreciated that the rear wheel attachment points 151 and the front wheel attachment points 150 may be adjusted in relation to one another, for example, in left and right directions when viewing the drawings. This can be accomplished in any suitable manner. For example, the front wheel attachment points 150 may be supported by front base frame members 153, which may be telescopically adjustable in relation to rear base frame members 154, and secured in a fixed position in any suitable manner, such as by use of fasteners (e.g., a screw, bolt or the like) (not shown) that cooperate with the front and rear base frame members 153, 154.

It should be understood that the dampening system 110 may include a tubular housing, apart from the vertical height adjustment post 118 and the caster fork assembly 43, and that the bushing and the tubular housing may take on other general shapes (e.g., a general oval, square, rectangular or triangular shape), wherein the bushing comprises radial projections with spacing therebetween, wherein the bushing fits flush against the inner wall of the tubular housing to form a snug or tight fit with the tubular housing.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A wheelchair comprising:
    a lower base frame comprising connection points to which wheels are connected for supporting the lower base frame for movement on a supporting surface,
    an upper seat frame configured to support a seat for supporting a user, and
    at least one connection point for attaching the upper seat frame and the lower base frame, the at least one connection point comprising:
    a housing having an axially-extending hollow interior supported in relation to one of the lower base frame or the upper seat frame by a support strut extending from a sidewall of the housing and coupled to the one of the lower base frame or the upper seat frame,
    a connection bracket comprising opposing arms configured to attach to the other one of the lower base frame or the upper seat frame, the housing axially extending between the opposing arms of the connection bracket, and
    a bushing formed of vibration dampening material housed within the hollow interior of the housing and retained within the housing by a fastener extending through the bushing and the housing and between the opposing walls of the connection bracket, the vibration dampening material isolating the upper seat frame from the lower base frame so that vibration from the lower base frame to the upper seat frame passes through and is dampened by the vibration dampening material.

2. The wheelchair of claim 1, wherein the bushing is configured to be housed snuggly within the housing.

3. The wheelchair of claim 1, wherein the bushing comprises a hub, multiple radial projections extending in spaced relation from the hub, and a radial projection space between the radial projections, and wherein the radial projection spaces remain void and unoccupied so that the radial projections compress into the radial projection spaces to absorb vibration.

4. The wheelchair of claim 1, wherein the vibration dampening material is made of urethane material selected from a group of materials of various durometers to accommodate various user weight and dampening requirements.

5. The wheelchair of claim 1, wherein the strut is vertically adjustable to adjust the height of the upper seat frame in relation to the lower base frame.

6. The wheelchair of claim 1, wherein the connection point is configured to adjust a user's center of gravity or accommodate different size users.

7. The wheelchair of claim 1, wherein the connection point is configured to provide a fine adjustment between the connection bracket and the housing and a course adjustment between the connection bracket and the upper seat frame.

8. A wheelchair comprising:
    a lower base frame comprising connection points to which wheels are connected for supporting the lower base frame for movement on a supporting surface,
    an upper seat frame configured to support a seat for supporting a user, and
    a plurality of connection points configured for connecting the upper seat frame in relation to the lower base frame, the connection points being configured to adjust the upper seat frame in relation to the lower base frame, the connection points each comprising:
    a housing having an axially-extending hollow interior supported in relation to one of the lower base frame or the upper seat frame by a support strut extending from a sidewall of the housing and coupled to the one of the lower base frame or the upper seat frame,
    a connection bracket comprising opposing arms supported in relation to the other one of the lower base frame or the upper seat frame, the housing axially extending between the opposing arms of the connection bracket,
    a bushing formed of vibration dampening material housed within the hollow interior of the housing and retained within the housing by the connection bracket, the vibration dampening material for dampening vibration from the lower base frame to the upper seat frame, and
    a fastener extending through the bushing and the housing and between the opposing walls of the connection bracket and holding the connection bracket and the vibration dampening bushing in relation to the housing.

9. The wheelchair of claim 8, wherein the connection points are configured to adjust the upper seat frame in relation to the lower base frame in fore and aft directions.

10. The wheelchair of claim 9, wherein each one of the connection points is configured to adjust a user's center of gravity or accommodate different size users.

11. The wheelchair of claim 8, wherein the bushing is configured to be housed snuggly within the housing.

12. The wheelchair of claim 11, wherein the bushing comprises a hub, multiple radial projections extending in spaced relation from the hub, and a radial projection space between the radial projections, and wherein the radial projection spaces remain void and unoccupied so that the radial projections compress into the radial projection spaces to absorb vibration.

13. The wheelchair of claim 8, wherein the vibration dampening material is made of urethane material selected from a group of materials of various durometers to accommodate various user weight and dampening requirements.

14. The wheelchair of claim 8, wherein the strut is vertically adjustable in relation to adjust the height of the upper seat frame in relation to the lower base frame.

15. The wheelchair of claim 8, wherein the strut of each one of the connection points is independently vertically adjustable to adjust the upper seat frame at a desired angle in relation to the lower base frame.

\* \* \* \* \*